US009627665B1

(12) United States Patent
Hsu et al.

(10) Patent No.: US 9,627,665 B1
(45) Date of Patent: Apr. 18, 2017

(54) BATTERY MODULE AND MANUFACTURING METHOD THEREOF

(71) Applicant: J-TEK INCORPORATION, Hsinchu (TW)

(72) Inventors: Ming-Da Hsu, Hsinchu (TW); Jui-Yi Chien, Hsinchu (TW); Tzone-Yuan Kuo, Hsinchu (TW)

(73) Assignee: J-TEK INCORPORATION, Hsinchu (TW)

( * ) Notice: Subject to any disclaimer, the term of this patent is extended or adjusted under 35 U.S.C. 154(b) by 0 days.

(21) Appl. No.: 15/145,424

(22) Filed: May 3, 2016

(30) Foreign Application Priority Data

Feb. 5, 2016 (TW) .............................. 105103919 A

(51) Int. Cl.
*H01M 2/10* (2006.01)
*H01M 2/02* (2006.01)
*H01M 2/20* (2006.01)
*H01M 2/30* (2006.01)
*H01M 2/34* (2006.01)

(52) U.S. Cl.
CPC ......... *H01M 2/1077* (2013.01); *H01M 2/024* (2013.01); *H01M 2/206* (2013.01); *H01M 2/305* (2013.01); *H01M 2/34* (2013.01); *H01M 2220/20* (2013.01)

(58) Field of Classification Search
None
See application file for complete search history.

(56) References Cited

U.S. PATENT DOCUMENTS

| 2011/0189509 A1 | 8/2011 | Kang et al. |
| 2013/0207459 A1 | 8/2013 | Schröder et al. |

FOREIGN PATENT DOCUMENTS

TW        I508353 B        11/2015

*Primary Examiner* — Sarah A Slifka
(74) *Attorney, Agent, or Firm* — Muncy, Geissler, Olds & Lowe, P.C.

(57) ABSTRACT

A manufacturing method of a battery module is firstly to produce two integrated electrodes. An electrode plate has a plurality of electrode openings, and two electrode side plates have individual side-plate screw contact openings. The side walls of the two electrode side plates have individually inner-wall surfaces facing to each other. Two screw members are then bonded to the inner-wall surfaces of the two electrode plates. Two holder frames cover the electrode plate and the two screw members to form an integrated holder frame. Two holder frame side openings of the two holder frames are located respective to the side openings. A plurality of battery cells, each of which has a first and a second electrode, is combined to the two integration-battery-holder frames. The second electrode electrically connect one of the integrated electrodes, and a plurality of wires connects the first electrode to a plate bonding portion, such that a battery module can be produced.

10 Claims, 10 Drawing Sheets

BATTERY MODULE AND MANUFACTURING METHOD THEREOF

This application claims the benefit of Taiwan Patent Application Serial No. 105103919, filed Feb. 5, 2016, the subject matter of which is incorporated herein by reference.

BACKGROUND OF INVENTION

1. Field of the Invention

The invention relates to a battery module and a manufacturing method thereof, and more particularly to the battery module and the manufacturing method of the battery module that apply an integrated holder frame for universal usage.

2. Description of the Prior Art

Recently, due to price hike of oil and rising of environmental awareness, researches have been devoted to development in new energies for vehicles, such as the biodiesel, the fuel battery, the solar energy, the wind energy and any the like. On the other hand, in the current stage of vehicle development, electric cars are the mainstream for carrying the new energies. In general, the battery module for the electric cars usually includes a plurality of battery cells, a positive pole electrode holder and a negative pole electrode holder. In an assembly of the battery module, the battery cells can be arranged in series or in parallel.

However, while in producing the battery module, an integrated positive-pole holder frame and an integrated negative-pole holder frame shall be manufactured individually so as to establish electrical coupling of positive poles and negative poles of the battery cells, respectively. To meet various applications of the battery module, different molds with specific dimensions shall be required definitely. In practice, these molds would cost a lot, and thus would increase the cost in manufacturing the battery module well as the electric cars.

In addition, while in connecting the bases to the aforesaid integrated positive-pole holder frame and the integrated negative-pole holder frame, a metal-welding process is usually applied to electrically connect the integrated holder frame and the corresponding bus. However, such a connection means leaves little room for adjusting contact resistance between the bus and the integrated holder frame. Also, in this application, two problems of "difficult to adjust contact resistance" and "non-uniformed distributed contact resistance" are usually met. Hence, an improvement upon manufacturing of the battery module is definitely necessary to the art.

SUMMARY OF THE INVENTION

In considering that the current technique in producing the battery module shall include specific designs for connecting the positive poles and the negative poles of the battery cells (generally, at least two sets of different tools or molds for manufacturing the integrated holder frame shall be prepared), thus higher cost for producing the battery module is inevitable, and also problems of "difficult to adjust contact resistance between the bus and the corresponding integrated holder frame" and "non-uniformed distributed contact resistance" exist. Accordingly, it is the primary object of the present invention to provide a battery module and a manufacturing method of the battery module that can apply the same integrated holder frames for either the positive poles or the negative poles, such that the cost and complexity in producing the battery module can be reduced.

In the present invention, a manufacturing method of a battery module, for producing a battery module comprises a Step (a) of producing a first integrated electrode and a second integrated electrode, the first integrated electrode including a first electrode plate and two first electrode side plates, the first electrode plate having a plurality of first electrode openings, the two first electrode side plates extending individually from two opposing ends of the first electrode plate in a first extension direction, each of the two first electrode side plates having a first side-plate screw contact opening, the two first electrode side plates having individual first inner-wall surfaces facing each other, the second integrated electrode including a second electrode plate and two second electrode side plates, the second electrode plate having a plurality of second electrode openings, the two second electrode side plates extending individually from two opposing ends of the second electrode plate in a second extension direction, each of the two second electrode side plates having a second side-plate screw contact opening, the two second electrode side plates having individual second inner-wall surfaces facing each other; a Step (b) of attaching two first screw members individually to the respective first inner-wall surfaces of the two corresponding first electrode side plates, and also attaching two second screw members individually to the respective second inner-wall surfaces of the two corresponding second electrode side plates; a Step (c) of producing a first holder frame and a second holder frame, having the first holder frame to cover the first electrode plate and the two first screw members so as thereby to form integrally a first integrated holder frame, having the second holder frame to cover the second electrode plate and the two second screw members so as thereby to form integrally a second integrated holder frame, the first holder frame having a plurality of first battery-cell accommodation spaces, a plurality of first holder frame openings and two first holder frame side openings, the plurality of first holder frame openings being located individually respective to the plurality of first electrode openings, thus each of the plurality of first plate bonding portions being exposed at a place close to the first electrode opening of the corresponding first electrode plate, the two first holder frame side openings being located individually respective to the first side openings of the corresponding two first electrode side plates, the second holder frame having a plurality of second battery-cell accommodation spaces, a plurality of second holder frame openings and two second holder frame side openings, the plurality of second holder frame openings being located individually respective to the plurality of second electrode openings, each of the plurality of second plate bonding portions being exposed at another place closing to the second electrode opening of the corresponding second electrode plate, the two second holder frame side openings being located individually respective to the second side-plate screw contact openings of the corresponding two second electrode side plates; a Step (d) of assembling a plurality of battery cells to the first integrated holder frame and the second integrated holder frame in a manner of the battery cells being fitted individually partially into the corresponding first battery-cell accommodation spaces and partially into the corresponding second battery-cell accommodation spaces, each of the battery cells having a first electrode and a second electrode, the first electrode being separated to the first integrated electrode by the first holder frame and exposing through the corresponding first electrode opening, the second electrode being also separated to the second integrated electrode by the second holder frame and exposing through the corresponding second electrode opening; and, a Step (e) of connecting a plurality of first wires to bridge individually the first electrodes of the respective battery cells and the corresponding first plate bonding portions of the respective first electrodes, and connecting a plurality of second wires to bridge individually the second electrodes of the respective battery cells and the corresponding second plate bonding portions of the respective second electrodes, the plurality of first wires and the plurality of second wires being formed as a plurality of fuses, such that the battery module is produced.

In one embodiment of the method, each of the first screw member and the second screw member is a screw nut, each cross section of the first wires and the second wires is one of a rectangular cross section, a circular cross section and an elliptic cross section, and each of the first wires and the second wires is made of an aluminum wire or a metal wire with a lower melting point such that a fuse for battery limiting protection can be obtained. In addition, each of the first battery-cell accommodation spaces and the second battery-cell accommodation spaces includes at least one attachment groove for receiving an adhesive to adhere one corresponding battery cell. A center hole of the first screw member is aligned with a center of the corresponding side-plate screw contact opening of each of the two first electrode side plates, and a center hole of the second screw member is aligned with a center of the corresponding side-plate screw contact opening of each of the two second electrode side plates. Further, a side of the first holder frame has at least one first engagement part, an opposing side of the first holder frame has at least one second engagement part, a side of the second holder frame has at least one third engagement part, and an opposing side of the second holder frame has at least one fourth engagement part, wherein each of the at least one first engagement part, the at least one second engagement part, the at least one third engagement part and the at least one fourth engagement part is one of a protrusive block and a concave groove.

In another aspect of the present invention, the battery module comprises a first integrated holder frame, a second integrated holder frame and a plurality of battery. The first integrated holder frame further includes a first integrated electrode and a first holder frame. The first integrated electrode includes a first electrode plate and two first electrode side plates. The first electrode plate has a plurality of first electrode openings, and exposes a plurality of first plate bonding portions at places closing to the plurality of corresponding first electrode openings of the first electrode plate. The two first electrode side plates extend individually from opposing ends of the first electrode plate in a first extension direction, and each of the two first electrode side plates further has a first side-plate screw contact opening, and have individually first inner-wall surfaces to face each other for attaching the corresponding first screw members. The first holder frame includes a plurality of first battery-cell accommodation spaces, a plurality of first holder frame openings and two first holder frame side openings. The plurality of first holder frame openings is located individually respective to the plurality of first electrode openings and communicative in space with the plurality of corresponding first battery-cell accommodation spaces. The two first holder frame side openings are located individually respective to the first side-plate screw contact openings of the corresponding two first electrode side plates. The second integrated holder frame includes a second integrated electrode and a second holder frame. The second integrated electrode further includes a second electrode plate and two second electrode side plates. The second electrode plate has a plurality of second electrode openings, and exposes a plurality of second plate bonding portions at places closing to the plurality of corresponding second electrode openings of the second electrode plate. The two second electrode side plates extend individually from opposing ends of the second electrode plate in a second extension direction, each of the two second electrode side plates further has a second side-plate screw contact opening, and the two second electrode side plates have individually second inner-wall surfaces to face each other for attaching the corresponding second screw members. The second holder frame includes a plurality of second battery-cell accommodation space, a plurality of second holder frame openings and two second holder frame side openings. The plurality of second holder frame openings is located individually respective to the plurality of second electrode openings and communicative in space with the plurality of corresponding second battery-cell accommodation spaces. The two second holder frame side openings are located individually respective to the second side-plate screw contact openings of the corresponding two second electrode side plates. The plurality of battery cells is fitted individually partially into the corresponding first battery-cell accommodation spaces and partially into the corresponding second battery-cell accommodation spaces, each of the battery cells has a first electrode and a second electrode, the first electrode is separated to the first integrated electrode by the first holder frame and exposed through the corresponding first electrode opening, the second electrode is also separated to the second integrated electrode by the second holder frame and exposed through the corresponding second electrode opening. In the present invention, a plurality of first wires is connected to bridge individually the first electrodes of the respective battery cells and the corresponding first plate bonding portions of the respective first electrodes, a plurality of second wires is connected to bridge individually the second electrodes of the respective battery cells and the corresponding second plate bonding portions of the respective second electrodes, and the plurality of first wires and the plurality of second wires are formed as a plurality of fuses.

In one embodiment of the battery module, each of the first screw member and the second screw member is a screw nut, each cross section of the first wires and the second wires is one of a rectangular cross section, a circular cross section and an elliptic cross section, and each of the first wires and the second wires is made of an aluminum wire or a metal wire with a lower melting point such that a fuse for battery limiting protection can be obtained. In addition, each of the first battery-cell accommodation spaces and the second battery-cell accommodation spaces includes at least one attachment groove for receiving an adhesive to adhere one corresponding battery cell. A center hole of the first screw member is aligned with a center of the corresponding side-plate screw contact opening of each of the two first electrode side plates, and a center hole of the second screw member is aligned with a center of the corresponding side-plate screw contact opening of each of the two second electrode side plates. Further, a side of the first holder frame has at least one first engagement part, an opposing side of the first holder frame has at least one second engagement part, a side of the second holder frame has at least one third engagement part, and an opposing side of the second holder frame has at least one fourth engagement part, wherein each of the at least one first engagement part, the at least one second engagement part, the at least one third engagement part and the at least one fourth engagement part is one of a protrusive block and a concave groove.

By providing the battery module and the manufacturing method thereof in accordance with the present invention, since both the integrated holder frames are identical, thus a set of tooling is required, and so the production cost can be significantly reduced.

All these objects are achieved by the battery module and the manufacturing method thereof described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a battery module and a manufacturing method thereof. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Since various embodiments for the battery module and the manufacturing method thereof can be organized in accordance with the present invention, however, only the preferred embodiment thereof is raised for explaining in details the present invention, and other embodiments would be omitted herein.

Figure 1A:
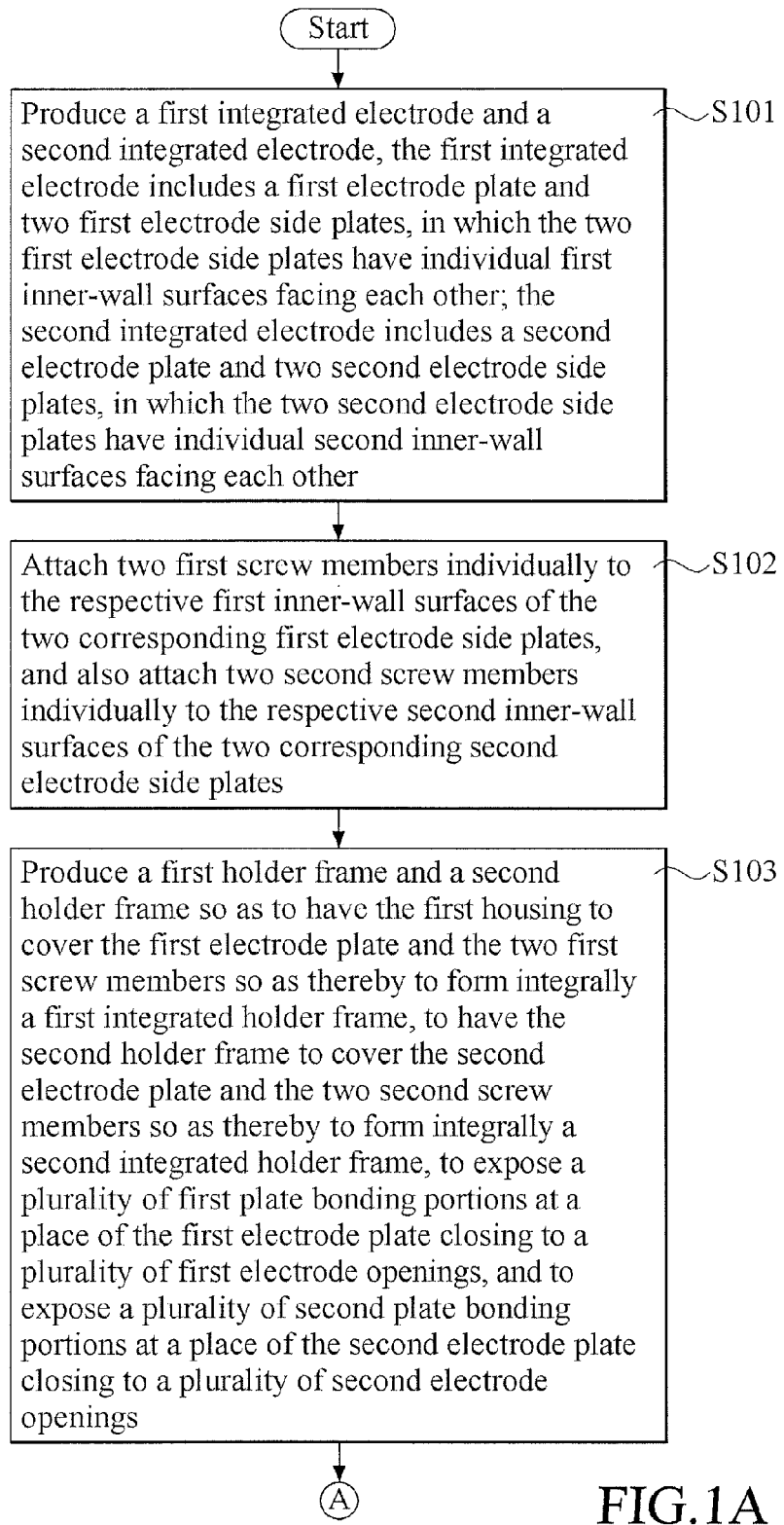
FIG. 1A and FIG. 1B together demonstrate continuously a flowchart of the manufacturing method of the battery module in accordance with the present invention.
Figure 1B:
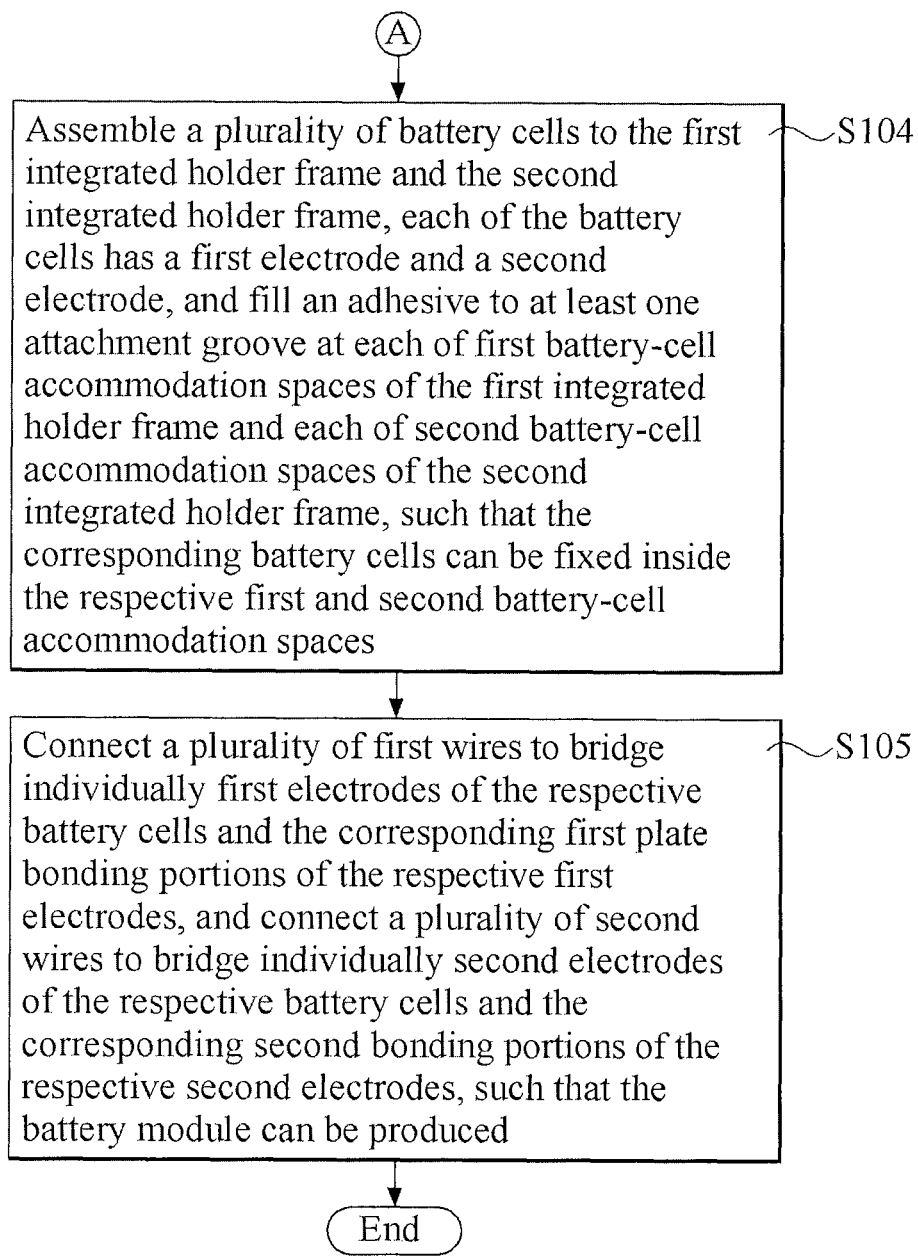
Figure 2:
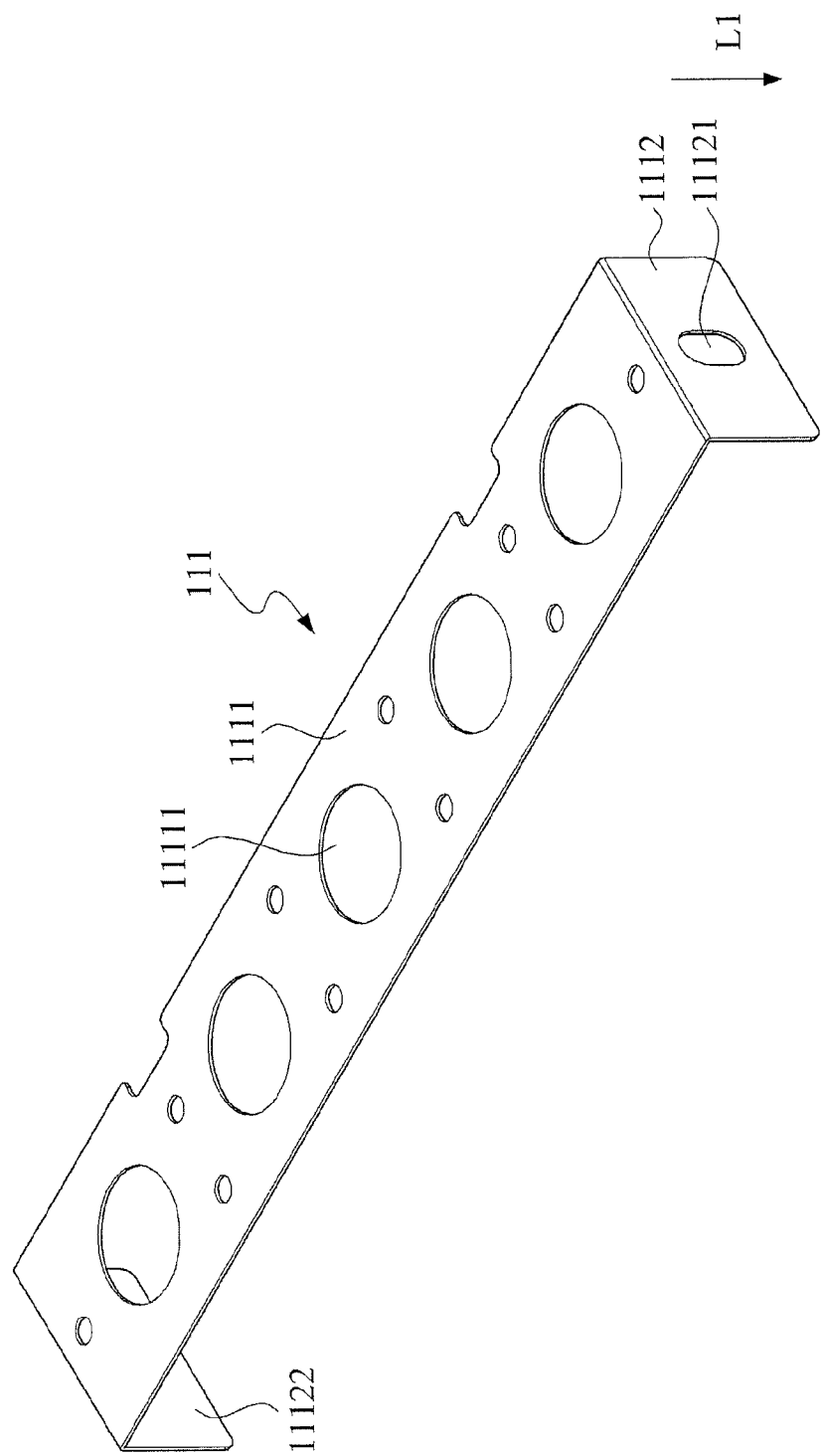
FIG. 2 is a schematic perspective view of a first integrated electrode for a preferred embodiment of the battery module in accordance with the present invention.
Figure 3:
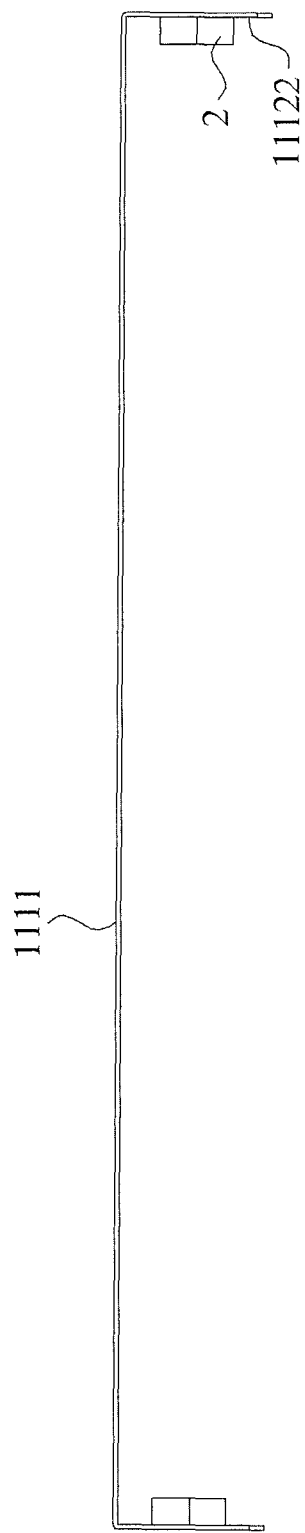
FIG. 3 is a schematic lateral side view of a first screw member and a first inner-wall surface for anchoring the screw member for the preferred embodiment of the battery module in accordance with the present invention.
Figure 4:
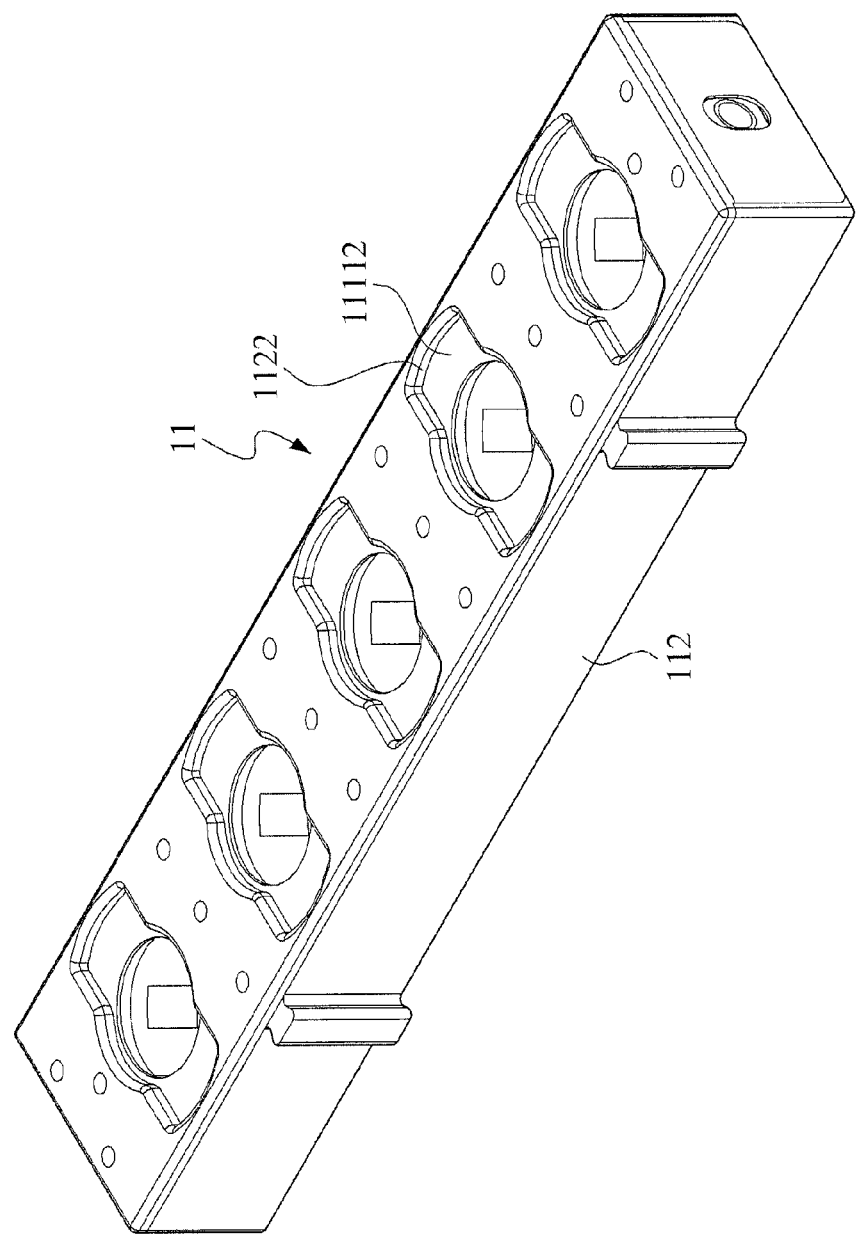
FIG. 4 is a schematic perspective view of a first integrated holder frame for the preferred embodiment of the battery module in accordance with the present invention.
Figure 4A:
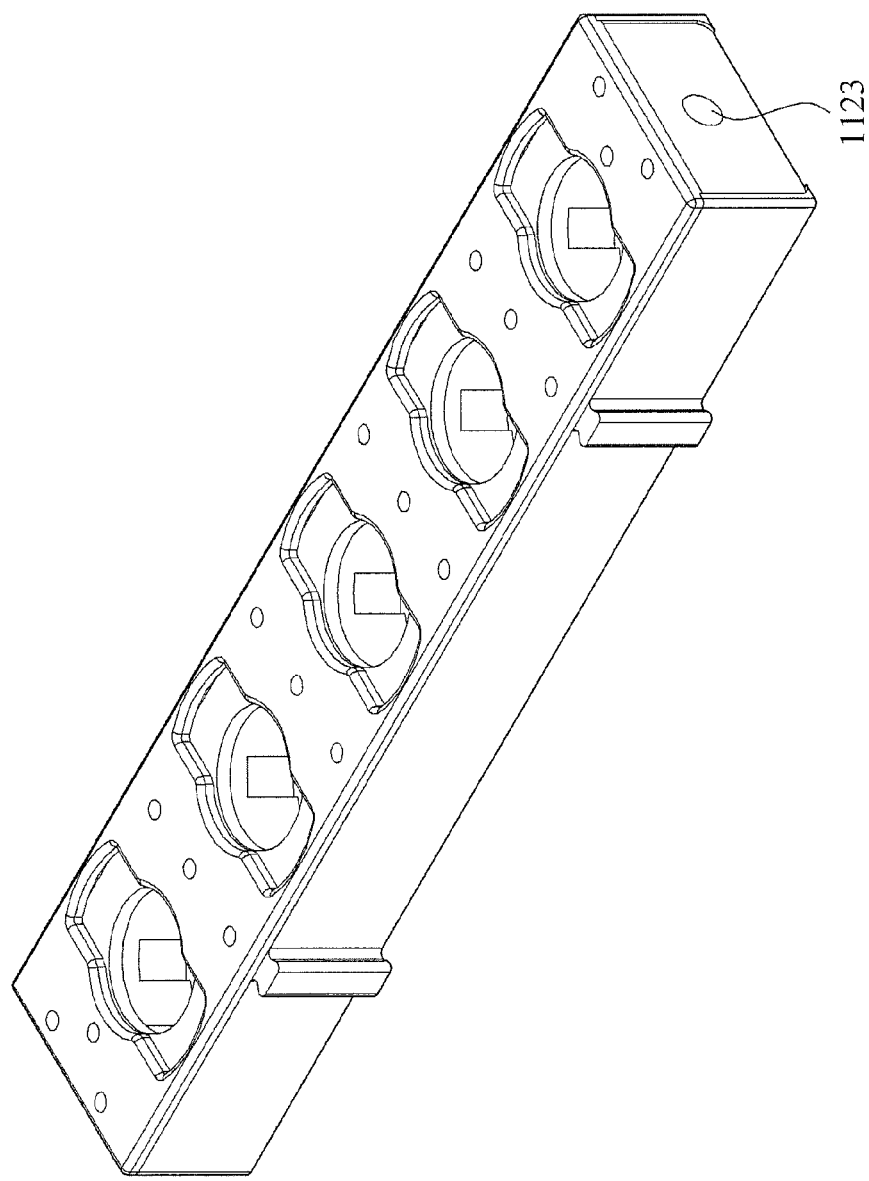
FIG. 4A is a schematic perspective view of the first holder frame for the preferred embodiment of the battery module in accordance with the present invention.
Figure 5:
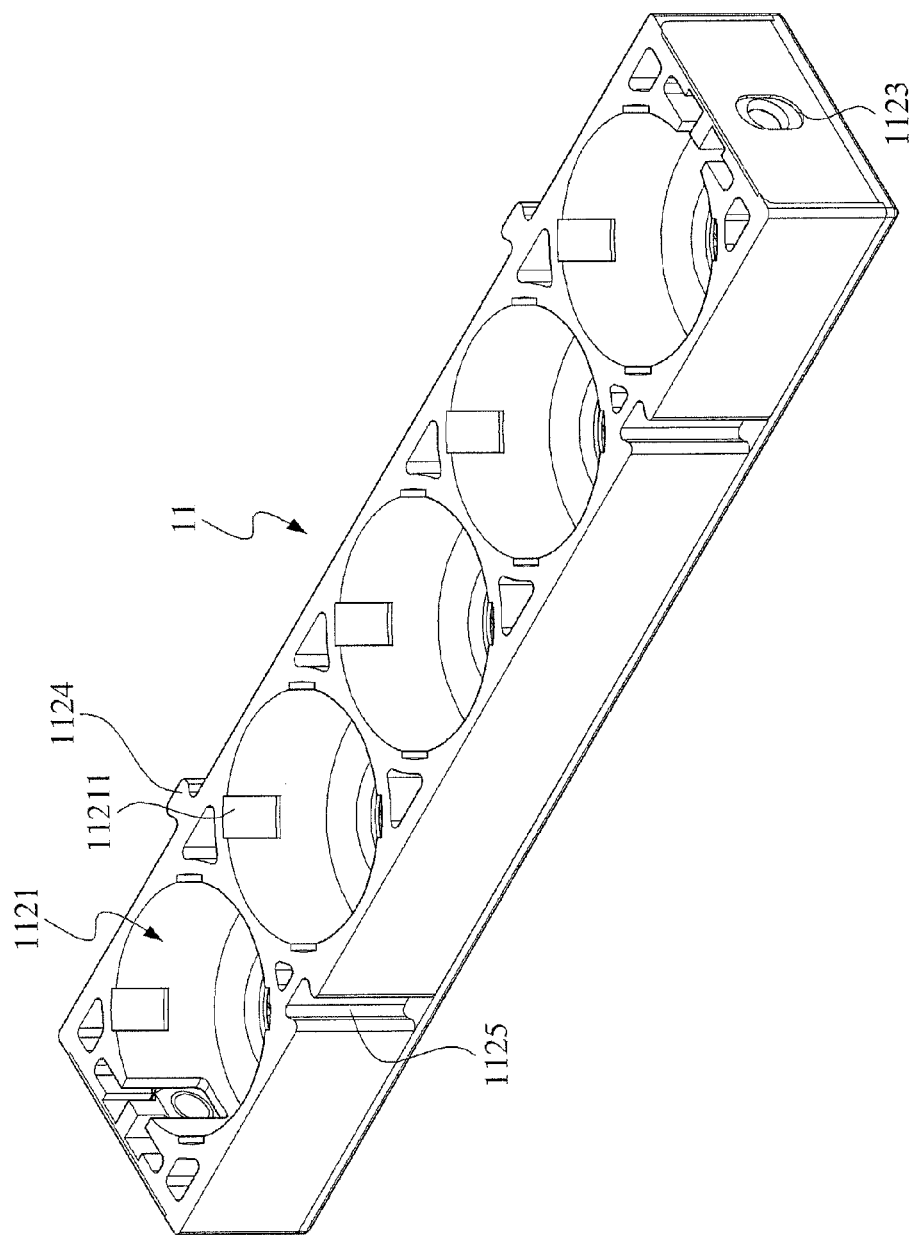
FIG. 5 is another view of FIG. 4.
Figure 6:
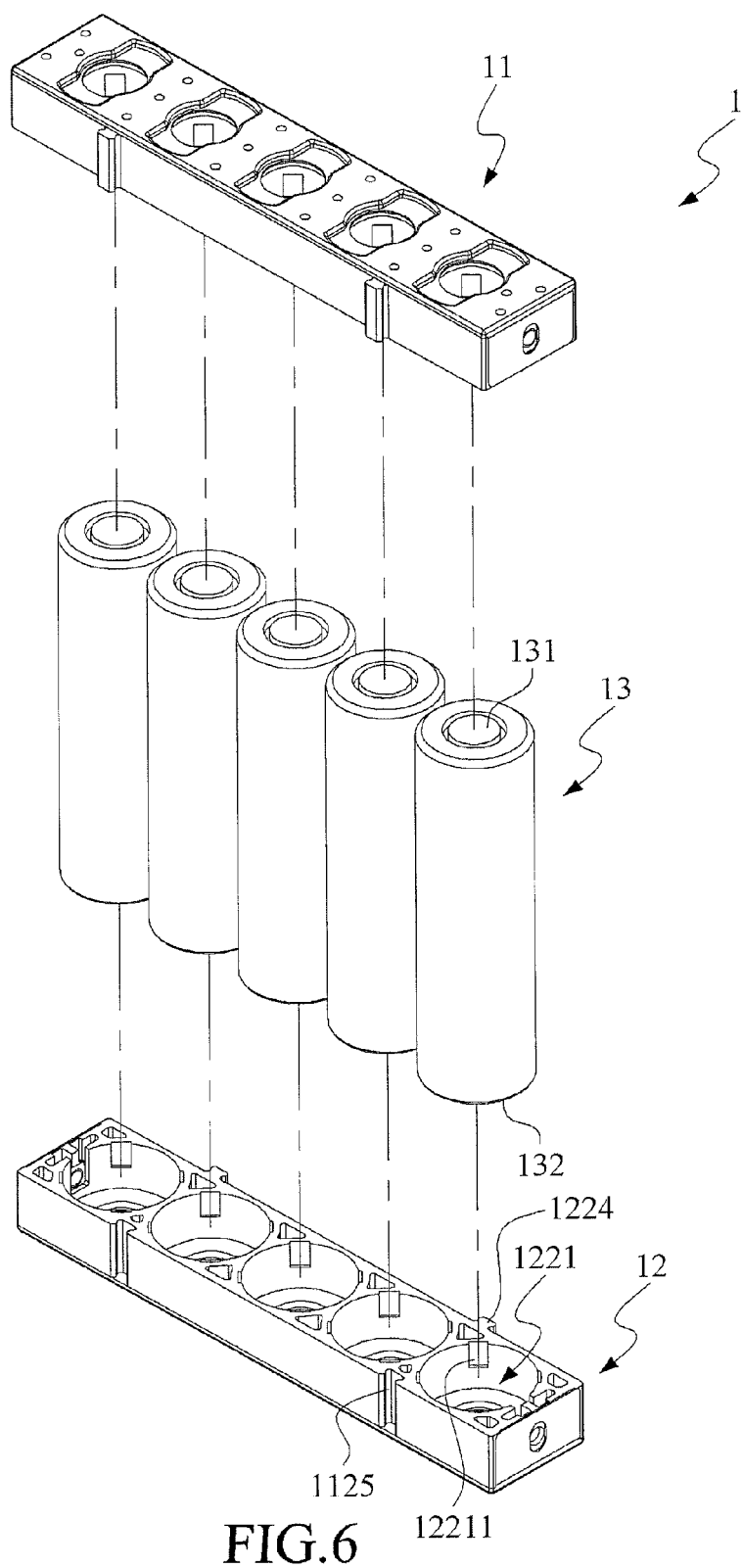
FIG. 6 is a schematic exploded view of the preferred embodiment of the battery module in accordance with the present invention.
Figure 7:
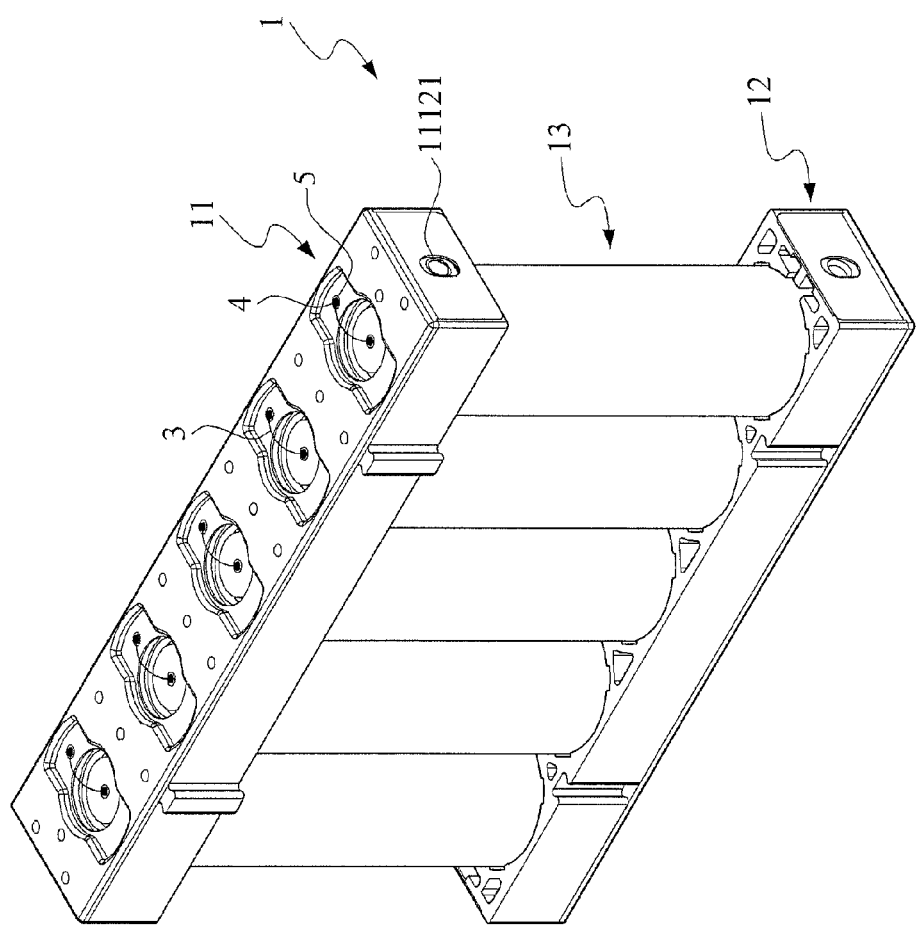
FIG. 7 is a perspective view of FIG. 6.

Refer now to FIG. 1A through FIG. 7; in which FIG. 1A and FIG. 1B together demonstrate continuously a flowchart of the manufacturing method of the battery module in accordance with the present invention, FIG. 2 is a schematic perspective view of a first integrated electrode for a preferred embodiment of the battery module in accordance with the present invention, FIG. 3 is a schematic lateral side view of a first screw member and a first inner-wall surface for anchoring the screw member for the preferred embodiment of the battery module in accordance with the present invention, FIG. 4 is a schematic perspective view of a first integrated holder frame for the preferred embodiment of the battery module in accordance with the present invention, FIG. 4A is a schematic perspective view of the first holder frame for the preferred embodiment of the battery module in accordance with the present invention, FIG. 5 is another view of FIG. 4, FIG. 6 is a schematic exploded view of the preferred embodiment of the battery module in accordance with the present invention, and FIG. 7 is a perspective view of FIG. 6.

As shown, the preferred manufacturing method of the battery module in accordance with the present is to manufacture a battery module 1, and further includes the following Steps.

Step S101: Produce a first integrated electrode and a second integrated electrode. The first integrated electrode includes a first electrode plate and two first electrode side plates, in which the two first electrode side plates have individual first inner-wall surfaces facing each other. Also, the second integrated electrode includes a second electrode plate and two second electrode side plates, in which the two second electrode side plates have individual second inner-wall surfaces facing each other.

Step S102: Attach two first screw members individually to the respective first inner-wall surfaces of the two corresponding first electrode side plates, and also attach two second screw members individually to the respective second inner-wall surfaces of the two corresponding second electrode side plates.

Step S103: Produce a first holder frame and a second holder frame so as to have the first holder frame to cover the first electrode plate and the two first screw members so as thereby to form integrally a first integrated holder frame, to have the second holder frame to cover the second electrode plate and the two second screw members so as thereby to form integrally a second integrated holder frame, to expose a plurality of first plate bonding portions at a place of the first electrode plate closing to a plurality of first electrode openings, and to expose a plurality of second plate bonding portions at a place of the second electrode plate closing to a plurality of second electrode openings.

Step S104: Assemble a plurality of battery cells to the first integrated holder frame and the second integrated holder frame. Each of the battery cells has a first electrode and a second electrode, and fill an adhesive to at least one attachment groove at each of first battery-cell accommodation spaces of the first integrated holder frame and each of second battery-cell accommodation spaces of the second integrated holder frame, such that the corresponding battery cells can be fixed inside the respective first and second battery-cell accommodation spaces.

Step S105: Connect a plurality of first wires to bridge individually first electrodes of the respective battery cells and the corresponding first plate bonding portions of the respective first electrodes, and connect a plurality of second wires to bridge individually second electrodes of the respective battery cells and the corresponding second plate bonding portions of the respective second electrodes, such that the battery module can be produced.

In Step S101, as shown in FIG. 2, a stamp or punch process is applied to produce the first integrated electrode 111 and the second integrated electrode. The first integrated electrode 111 includes the first electrode plate 1111 and the two first electrode side plate 1112 (one only labeled in the figure). The first electrode plate 1111 made of a metallic material further has the plurality of first electrode openings 11111 (one only labeled in the figure). In the preferred embodiment of the present invention, the first electrode opening 11111 is, but not limited to, circularly shaped. In addition, the first electrode plate 1111 further has a plurality of position holes (not labeled in the figure) for positioning during the manufacturing.

The two first electrode side plates 1112 are extended individually from two opposing ends of the first electrode plate 1111 in a first extension direction L1, and each of the two first side plates 1112 has a first side-plate screw contact opening 11121. Also, the two first electrode side plates 1112 have individually corresponding first inner-wall surfaces 11122 to face each other.

It shall be noted that the second integrated electrode and the first integrated electrode 111 are structurally identical. Namely, the second integrated electrode includes the second electrode plate (not labeled in the figure) and the two second electrode side plates (not labeled in the figure), in which the second electrode plate made of a metallic material further has the plurality of second electrode opening (not labeled in the figure). Similarly, in the preferred embodiment of the present invention, the second electrode opening is circularly shaped. Both of the first electrode plate and the second electrode plate have individually the plurality of position holes (not labeled in the figure) for a positioning purpose during the manufacturing and for reinforcing the connection strength between the holder frame and the electrode plates.

The two second electrode side plates are extended individually from two opposing ends of the second electrode plate in a second extension direction, in which the second extension direction and the foregoing first extension direction L1 are the same direction. Each of the second electrode side plates has a second side-plate screw contact opening, and the two second electrode side plates have individually corresponding second inner-wall surfaces (not labeled in the figure) to face each other.

In Step S102, as shown in FIG. 3, each of the two first screw members 2 is attached to the corresponding first inner-wall surface 11122 of the respective first electrode side plate 1112, and also each of the second screw members (not labeled in the figure) is attached to the corresponding second inner-wall surface (not labeled in the figure) of the respective second electrode side plate. In this embodiment, both the first screw members 2 and the second screw members are all screw nuts with internal threads. In addition, while in attaching the two first screw members 2 to the two corresponding first inner-wall surfaces 11122, a metal-welding process, a gluing process or any other means the like can be applied to attach the first screw members 2 to the corresponding first inner-wall surfaces 11122. Similarly, the attaching of the second screw members to the corresponding second inner-wall surfaces can apply a metal-welding process, a gluing process or any other means the like. While in the attaching process, a center hole of the first screw member 2 shall align a center of the side-plate screw contact opening of the respective first electrode side plate 1112, and also a center hole of the second screw member shall align a center of the side-plate screw contact opening of the respective second electrode side plate.

In Step S103, as shown in FIG. 4 and FIG. 5, produce the first holder frame 112 and the second holder frame, in which the first holder frame 112 covers the first electrode plate 1111 and the two first screw members 2 such that the first integrated holder frame 11 can be formed, and in which the second holder frame covers the second electrode plate and the two second screw members such that a second integrated holder frame 12 can be formed.

It shall be noted that, in this preferred embodiment, while in producing the first holder frame 112, the first integrated electrode 111 is placed in a specific mold so as to have outer-wall surfaces of the two corresponding first electrode side plates 1112 (the opposing surfaces of the two corresponding first inner-wall surfaces 11122 having the respective first screw members attached thereon) not to attach to any interior wall of the mold. Then, an injection molding process is applied to manufacture the first holder frame 112, such that the first holder frame 112 can cover the first electrode plate 1111, the two first screw members 2 and further the two first electrode side plates 1112. In the present invention, the first holder frame 112 is preferably made of a material of well insulation. Similarly, the manufacturing of the second holder frame is identical to that of the first holder frame 112, and thus details thereabout would be omitted herein.

In some other embodiments, while in manufacturing the first holder frame 112, the first integrated electrode 111 is placed in the aforesaid mold by having outer surfaces of the two first electrode side plates 1112 to attach to the interior walls of the mold, and then the injection molding is applied to manufacture the first holder frame 112, such that the first holder frame 112 can only cover the first electrode plates 1111 and the two first screw members 2. However, except for the aforesaid manufacturing processes, some other arrangements can still be the options per specific requirement in accordance with the present invention.

In Step S103, each of the plurality of first plate bonding portions 11112 is exposed at a place closing to the first electrode opening 11111 of the corresponding first electrode plate 1111, and also each of the plurality of second plate bonding portions (not labeled in the figure) is exposed at another place closing to the second electrode opening of the corresponding second electrode plate. The manufacturing method for these plate bonding portions can be, but not limited to, an injection molding or any the like.

The first holder frame 112 further has a plurality of first battery-cell accommodation spaces 1121, a plurality of first holder frame openings 1122 (one only labeled in the figure) and two first holder frame side openings 1123 (one only labeled in the figure). The first holder frame openings 1122 are located individually in correspondence with the first electrode openings 11111, and the two first holder frame side openings 1123 are located individually in correspondence with the first side-plate screw contact openings 11121 of the respective two first electrode side plate 1112. It shall be noted that the first holder frame side openings 1123 of the first holder frame 112 produced in this present invention are circular holes. In other embodiments, for example the embodiment that produces the first holder frame 112 without covering the two first electrode side plates 1112, the first holder frame side opening 1123 can be shaped as a " "⊓" " shape.

Similarly, the second holder frame has a plurality of second battery-cell accommodation spaces 1221, a plurality of second holder frame openings (not labeled in the figure) and two second holder frame side openings (not labeled in the figure). The second holder frame openings are located individually in correspondence with the second electrode openings, and the two second holder frame side openings are located individually in correspondence with the second side-plate screw contact openings of the respective two second electrode side plates. Namely, the first holder frame 112 is structurally identical to the second holder frame.

However, in some other embodiments, the second holder frame opening might not be included per its own requirement.

In Step S104, as shown in FIG. 6, the plurality of battery cells 13 is assembled into the first integrated holder frame 11 and the second integrated holder frame 12 in a sandwich manner, such that the battery cells 13 can be fitted individually partially into the corresponding first battery-cell accommodation spaces 1121 and partially into the corresponding second battery-cell accommodation spaces 1221. Each of the battery cells 13 has a first electrode 131 and a second electrode 132, where the first electrode 131 is separated to the first integrated electrode 111 by the first holder frame 112, and expose through the corresponding first electrode opening 11111. In this embodiment, the first electrode 131 is defined as a positive pole, and the second electrode 132 is defined as a negative pole. However, in some other embodiments, the defining of the poles can be relevantly switched. In addition, the second electrode 132 is also separated to the second integrated electrode by the second holder frame, and expose through the corresponding second electrode opening.

In addition, in Step S104 of the preferred embodiment, at least one attachment groove 11211 or/and 12211 in the first battery-cell accommodation spaces 1121 of the first integrated holder frame 11 and/or the second battery-cell accommodation spaces 1221 of the second integrated holder frame can be filled with an adhesive for fixedly adhering the corresponding battery cell 13. In practice, each of the first battery-cell accommodation spaces 1121 and the second battery-cell accommodation spaces 1221 can include four attachment grooves 11211 and 12211 (may be one in other embodiments), and the aforesaid at least one attachment groove 11211 is specifically filled with the adhesive (not shown in the figure) for adhering the corresponding battery cell 13. In the present invention, the adhesive can be a liquid for an adhering purpose such as a dispensing glue.

In Step S105, as shown in FIG. 7, a plurality of first wires 3 is introduced individually to bridge the first electrode 131 of each of the battery cells 13 and the first plate bonding portion 11112 respective to the corresponding first electrode 131, and also a plurality of second wires is introduced individually to bridge the second electrode 132 of each of the battery cells 13 and the second plate bonding portion 11112 respective to the corresponding second electrode 132; such that a battery module 1 can be produced. Preferably, the aforesaid first wires 3 and second wires can be produced to function as a plurality of fuses. It shall be noted that, though each pair of the first electrodes 131 and the corresponding first plate bonding portions 11112 is simply connected by a first wire 3 in this embodiment, two more wires may be relevantly applied in between according to an instant demand in other embodiments.

In addition, it shall be noted that the connection of the electrode and the corresponding plate bonding portion in a bridge manner in this embodiment is to fix opposing ends of the wire to the electrode and the plate bonding portion, respectively. The fixation method for the wire can be a spot welding, a solder pasting through a tin-melting furnace, or any the like. In this embodiment, the spot welding is applied to fix the wire. In addition, the aforesaid fuse is not limited to a form of a single wire, and other forms of the fuse can be also applied, specifically depending on the cross section of the wire.

In addition, in Step S105, a plurality of second wires (not shown in the figure) can be also applied to connect individually, in a bridge manner, the second electrodes 132 of the corresponding battery cells 13 to the second plate bonding portions respective to the second electrodes. The connection method for the second wires can be identical to that for the first wire 3, and thus details thereabout would be omitted herein.

In the present invention, the cross section of any of the first wires 3 and the second wires can be one of a rectangular cross section, a circular cross section and an elliptic cross section. If the rectangular cross section is applied, then the first wire 3 or the second wire can be a metal plate. If the circular or elliptic cross section is applied, then the first wire 3 or the second wire can be a nickel wire, an aluminum wire or any wire that can be used as a fuse. In addition, in other embodiments, a single-piece nickel plate can also be applied as the fuse.

In addition, as the first wires 3, the second wires, the first integrated electrode, the first electrodes 131, the second electrodes 132, the second integrated electrode and all external peripherals are all connected into a loop, and while one of the first wire 3 and the second wire adopts the aluminum wire or the like metal wire with a lower melting point, the fuse wire is determined to locate at the element who has the poorest capability to flow the current of the loop.

In addition, after each of the first electrode 131 and the corresponding first plate bonding portion 11112 are electrically connected via the first wires 3, an adhesive 5 is further fed to each of the two opposing bonding points 4 of the first wires 3 so as to provide necessary protection to the corresponding first wire 3 while in executing Step S105. For example, the protection can be to avoid separation of the first wire 3 and the corresponding metal-welding point. In addition, the adhesive 5 can be a liquid with substantial adhering capability, such as a dispensing glue. In addition, the management for the second wire is identical to that for the first wire 3, and thus details thereabout would be omitted herein.

In addition, in the preferred embodiment of the present invention, the first electrode 131 is electrically coupled with the corresponding first plate bonding portion 11112, while the second electrode 132 is electrically coupled with the second plate bonding portion. However, in some other embodiments, the arrangement of the aforesaid coupling may be performed in a reverse manner.

In addition, as shown in FIG. 5 to FIG. 7, a side of the first holder frame 112 includes at least one first engagement part 1124 (two shown in the figure, but only one labeled), while at least one second engagement part 1125 (two shown in the figure, but only one labeled) is located at another side opposing to the aforesaid side of the first holder frame 112. Also, a side of the second holder frame includes at least one third engagement part 1224 (two shown in the figure, but only one labeled), while at least one fourth engagement part 1225 (two shown in the figure, but only one labeled) is located at another side opposing to the aforesaid side of the second holder frame. The at least one first engagement part 1124 can be formed as one of a protrusive block and a concave groove, while the at least one second engagement part 1125 can also be one of a protrusive block and a concave groove. Similarly, the at least one third engagement part 1224 can be one of a protrusive block and a concave groove, while the at least one fourth engagement part 1225 can be one of a protrusive block and a concave groove.

It shall be noted that, in practice, when the engagement part at one side is a protrusive part, then the matching engagement part at the corresponding side is generally formed as a concave groove. For example, in the preferred embodiment of the present invention, the sides of the first holder frame 112 and the second holder frame for locating the first holder frame side opening 1123 and the second holder frame side opening are not identical. In the case that the first engagement part 1124 is formed as a protrusive block (engagement hook), then the second engagement part 1125 is formed as a concave groove (engagement groove), the third engagement part 1224 is formed as a protrusive block, and the fourth engagement part 1225 is formed as a concave groove. However, in some other embodiment, the aforesaid set of the engagement parts might have other arrangement. In practice, the existence of the aforesaid first engagement part 1124, second engagement part 1125, third engagement part 1224 and fourth engagement part 1225 are to facilitate a battery module to engage another battery module in an in-series or in-parallel extension.

Figure 8:
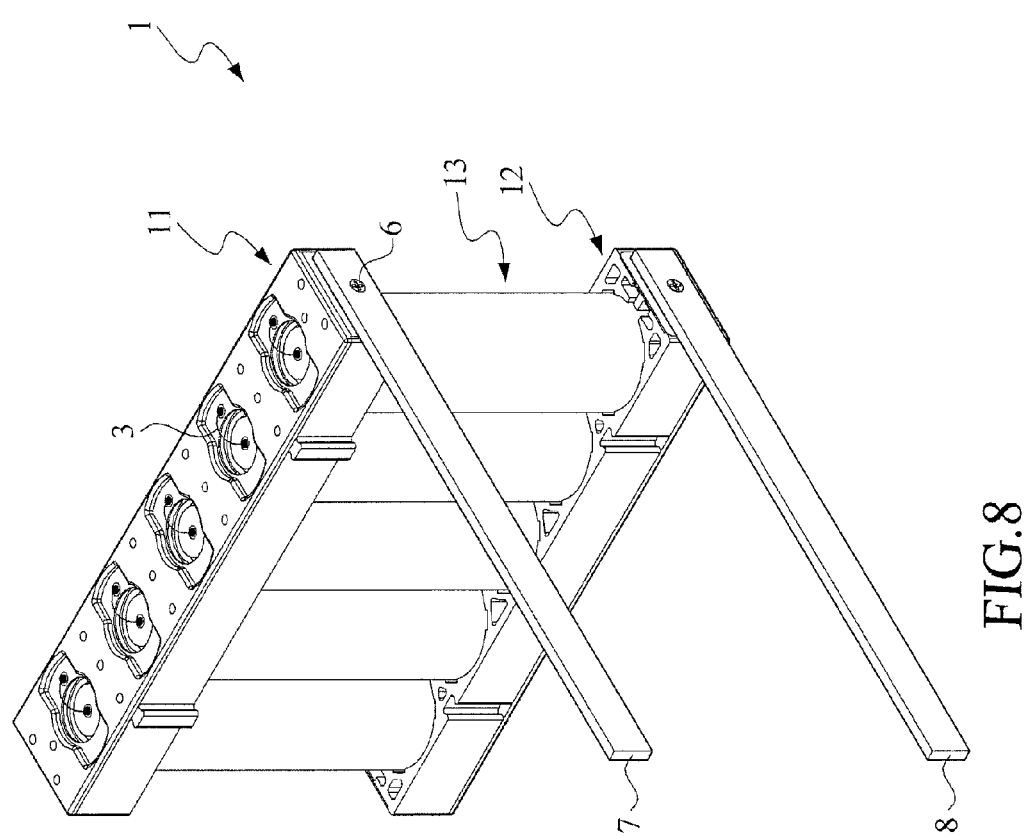
FIG. 8 is a schematic perspective view of a connection of two buses and corresponding electrode side plates of the preferred embodiment of FIG. 7 in accordance with the present invention.

Referring now to FIG. 8, a schematic perspective view of a connection of two buses and corresponding electrode side plates of the preferred embodiment of FIG. 7 in accordance with the present invention is shown. In the battery module 1 of the preferred embodiment of the present invention, the first side-plate screw contact opening 11121 or the two first holder frame side openings 1123 are to be penetrated by at least one screw 6. Namely, in practice, the screw 6 penetrates the first side-plate screw contact opening 11121 or the first holder frame side openings 1123 and then engages the first screw member 2, so that the bus 7 can contact the corresponding first electrode side plate 1112 via the first screw member 2. Practically, in the preferred embodiment of the present invention, since the first electrode side plate 1112 is largely covered by the side of the first holder frame 112, thus the bus 7 is contacted with the corresponding first electrode side plate 1112 via the first screw member 2, and thereby contact resistance is formed in between with the first electrode side plate 1112. In some other embodiment, if the first electrode side plate 1112 is not covered by any of the side of the first holder frame 112, then the bus 7 contacts directly the first electrode side plate 1112. Since the first screw member 2 is also contacted with the first electrode side plate 1112, thus substantial contact resistance still exists in between with the first electrode side plate 111.

Similarly, the second side-plate screw contact opening and the two second holder frame side openings also allow the screw 6 to penetrate through and to further engage the second screw member at another side, such that another bus 8 can contact the corresponding second electrode side plate via the second screw member.

It shall be noted that, as the screw 6 is fixed by the first screw member 2 or the second screw member, appropriate torque can be applied to achieve relevant balance among the resistances.

In summary, by providing the battery module and the manufacturing method thereof according to the present invention, since the both integrated holder frames are identical, thus practically a set of tooling is required. Further, by applying the matching of the screw and the pairing screw member to establish connection with the bus, so the resistance distribution between the bus and the integrated holder frame can be controlled. Hence, the preferred distribution of the contact resistance according to various needs can be adjusted conveniently by controlling the twist torque of the screw pair.

While the present invention has been particularly shown and described with reference to a preferred embodiment, it will be understood by those skilled in the art that various changes in form and detail may be without departing from the spirit and scope of the present invention.

What is claimed is:

1. A manufacturing method of a battery module, for producing a battery module, comprising the steps of:
    (a) producing a first integrated electrode and a second integrated electrode; the first integrated electrode including a first electrode plate and two first electrode side plates, the first electrode plate having a plurality of first electrode openings, the two first electrode side plates extending individually from two opposing ends of the first electrode plate in a first extension direction, each of the two first side plates having a first side-plate screw contact opening, the two first electrode side plates having individual first inner-wall surfaces facing each other; the second integrated electrode including a second electrode plate and two second electrode side plates, the second electrode plate having a plurality of second electrode openings, the two second electrode side plates extending individually from two opposing ends of the second electrode plate in a second extension direction, each of the two first side plates having a second side-plate screw contact opening, the two second electrode side plates having individual second inner-wall surfaces facing each other;
    (b) attaching two first screw members individually to the respective first inner-wall surfaces of the two corresponding first electrode side plates, and also attaching two second screw members individually to the respective second inner-wall surfaces of the two corresponding second electrode side plates;
    (c) producing a first holder frame and a second holder frame, having the first holder frame to cover the first electrode plate and the two first screw members so as thereby to form integrally a first integrated holder frame, having the second holder frame to cover the second electrode plate and the two second screw members so as thereby to form integrally a second integrated holder frame; the first holder frame having a plurality of first battery-cell accommodation spaces, a plurality of first holder frame openings and two first holder frame side openings, the plurality of first holder frame openings being located individually respective to the plurality of first electrode openings, thus each of the plurality of first plate bonding portions being exposed at a place closing to the first electrode opening of the corresponding first electrode plate, the two first holder frame side openings being located individually respective to the first side openings of the corresponding two first electrode side plates; the second holder frame having a plurality of second battery-cell accommodation spaces, a plurality of second holder frame openings and two second holder frame side openings, the plurality of second holder frame openings being located individually respective to the plurality of second electrode openings, each of the plurality of second plate bonding portions being exposed at another place closing to the second electrode opening of the corresponding second electrode plate, the two second holder frame side openings being located individually respective to the second side-plate screw contact openings of the corresponding two second electrode side plates;
    (d) assembling a plurality of battery cells to the first integrated holder frame and the second integrated holder frame in a manner of the battery cells being fitted individually partially into the corresponding first battery-cell accommodation spaces and partially into the corresponding second battery-cell accommodation spaces, each of the battery cells having a first electrode and a second electrode, the first electrode being separated to the first integrated electrode by the first holder frame and exposing through the corresponding first electrode opening, the second electrode being also separated to the second integrated electrode by the second holder frame and exposing through the corresponding second electrode opening; and (e) connecting a plurality of first wires to bridge individually the first electrodes of the respective battery cells and the corresponding first plate bonding portions of the respective first electrodes, and connecting a plurality of second wires to bridge individually the second electrodes of the respective battery cells and the corresponding second bonding portions of the respective second electrodes, the plurality of first wires and the plurality of second wires being formed as a plurality of fuses, such that the battery module is produced.

2. The manufacturing method of a battery module of claim 1, wherein each of the first screw member and the second screw member is a screw nut.

3. The manufacturing method of a battery module of claim 1, wherein each cross section of the first wires and the second wires is one of a rectangular cross section, a circular cross section and an elliptic cross section.

4. The manufacturing method of a battery module of claim 1, wherein each of the first battery-cell accommodation spaces and the second battery-cell accommodation spaces has at least one attachment groove for receiving an adhesive to adhere the corresponding battery cell.

5. The manufacturing method of a battery module of claim 1, wherein a side of the first holder frame has at least one first engagement part, an opposing side of the first holder frame has at least one second engagement part, a side of the second holder frame has at least one third engagement part, and an opposing side of the second holder frame has at least one fourth engagement part; wherein each of the at least one first engagement part, the at least one second engagement part, the at least one third engagement part and the at least one fourth engagement part is one of a protrusive block and a concave groove.

6. A battery module, comprising:
a first integrated holder frame, further including:
a first integrated electrode, further including:
a first electrode plate, having a plurality of first electrode openings, exposing a plurality of first plate bonding portions at places closing to the plurality of corresponding first electrode openings of the first electrode plate; and
two first electrode side plates, extending individually from opposing ends of the first electrode plate in a first extension direction, each of the two first electrode side plates further having a first side-plate screw contact opening, the two first electrode side plates having individually first inner-wall surfaces to face each other for attaching the corresponding first screw members; and
a first holder frame, further including:
a plurality of first battery-cell accommodation spaces;
a plurality of first holder frame openings, located individually respective to the plurality of first electrode openings and communicative in space with the plurality of corresponding first battery-cell accommodation spaces; and
two first holder frame side openings, located individually respective to the first side-plate screw contact openings of the corresponding two first electrode side plates;
a second integrated holder frame, further including:
a second integrated electrode, further including:
a second electrode plate, having a plurality of second electrode openings, exposing a plurality of second plate bonding portions at places closing to the plurality of corresponding second electrode openings of the second electrode plate; and
two second electrode side plates, extending individually from opposing ends of the second electrode plate in a second extension direction, each of the two second electrode side plates further having a second side-plate screw contact opening, the two second electrode side plates having individually second inner-wall surfaces to face each other for attaching the corresponding second screw members; and
a second holder frame, further including:
a plurality of second battery-cell accommodation space;
a plurality of second holder frame openings, located individually respective to the plurality of second electrode openings and communicative in space with the plurality of corresponding second battery-cell accommodation spaces; and
two second holder frame side openings, located individually respective to the second side-plate screw contact openings of the corresponding two second electrode side plates; and
a plurality of battery cells, being fitted individually partially into the corresponding first battery-cell accommodation spaces and partially into the corresponding second battery-cell accommodation spaces, each of the battery cells having a first electrode and a second electrode, the first electrode being separated to the first integrated electrode by the first holder frame and exposing through the corresponding first electrode opening, the second electrode being also separated to the second integrated electrode by the second holder frame and exposing through the corresponding second electrode opening;
wherein a plurality of first wires is connected to bridge individually the first electrodes of the respective battery cells and the corresponding first plate bonding portions of the respective first electrodes, a plurality of second wires is connected to bridge individually the second electrodes of the respective battery cells and the corresponding second plate bonding portions of the respective second electrodes, and the plurality of first wires and the plurality of second wires are formed as a plurality of fuses.

7. The battery module of claim 6, wherein each of the first screw member and the second screw member is a screw nut.

8. The battery module of claim 6, wherein each cross section of the first wires and the second wires is one of a rectangular cross section, a circular cross section and an elliptic cross section.

9. The battery module of claim 6, wherein each of the first battery-cell accommodation spaces and the second battery-cell accommodation spaces has at least one attachment groove for receiving an adhesive to adhere the corresponding battery cell.

10. The battery module of claim 6, wherein a side of the first holder frame has at least one first engagement part, an opposing side of the first holder frame has at least one second engagement part, a side of the second holder frame has at least one third engagement part, and an opposing side of the second holder frame has at least one fourth engagement part; wherein each of the at least one first engagement part, the at least one second engagement part, the at least one third engagement part and the at least one fourth engagement part is one of a protrusive block and a concave groove.

* * * * *